(12) United States Patent
Bouette et al.

(10) Patent No.: US 6,771,906 B1
(45) Date of Patent: Aug. 3, 2004

(54) OPTICAL LINE DISTRIBUTION FRAME

(75) Inventors: Claude Le Bouette, Bretigny sur Orge (FR); Michel Sotom, Paris (FR); François-Xavier Ollivier, Guibeville (FR)

(73) Assignee: Alcatel, Paris (FR)

( * ) Notice: Subject to any disclaimer, the term of this patent is extended or adjusted under 35 U.S.C. 154(b) by 727 days.

(21) Appl. No.: 09/594,766

(22) Filed: Jun. 16, 2000

(30) Foreign Application Priority Data

Jun. 28, 1999 (FR) .......................................... 99 08215

(51) Int. Cl.[7] .............................................. H04J 14/00
(52) U.S. Cl. ........................... 398/50; 398/45; 398/48; 398/51; 398/55; 398/56
(58) Field of Search ............................ 398/45, 48, 50, 398/51, 55, 56

(56) References Cited

U.S. PATENT DOCUMENTS

| | | | |
|---|---|---|---|
| 5,739,935 A | 4/1998 | Sabella | ........................ 359/128 |
| 5,777,761 A | 7/1998 | Fee | .............................. 359/110 |
| 5,805,320 A | * 9/1998 | Kuroyanagi et al. | ........... 398/56 |
| 5,889,600 A | * 3/1999 | McGuire | ...................... 398/50 |

OTHER PUBLICATIONS

Kobayashi, H. et al.: "Duality Relationships Among Space, Time and Wavelength in All–Optical Networks" Journal of Lightwave Technology, US, IEEE. New York, vol. 14, No. 3, Mar. 1, 1996, pp. 344–350, XP000586119.

Wuttisittikulkij, L. et al.: "Use of Spare Wavelengths for Traffic Restoration in Multi–Wavelength Transport Network" IEEE International Conference on Communications (ICC), US, New York, IEEE, 1996, pp. 1778–1782, XP000625112.

Okamoto, S. et al.: "Optical Path Cross–Connect Node Architectures for Photonic Transport Network" Journal of Lightwave Technology, US, IEEE New York, vol. 14, No. 6, Jun. 1, 1996, pp. 1410–1422, XP000598543.

* cited by examiner

Primary Examiner—M. R. Sedighian
(74) Attorney, Agent, or Firm—Sughrue Mion, PLLC

(57) ABSTRACT

To solve a problem of modularity favoring under-equipping and a problem of energy losses in an all-optical distribution frame for optical lines, a primary converter block includes a redundancy circuit which can emit an optical signal with a wavelength different from any of the other wavelengths broadcast by the other converter circuits of the primary block. In this case a star coupler responsible for frequency domain cross-connection of the signals preferably includes P+1 input channels for P output channels.

12 Claims, 4 Drawing Sheets

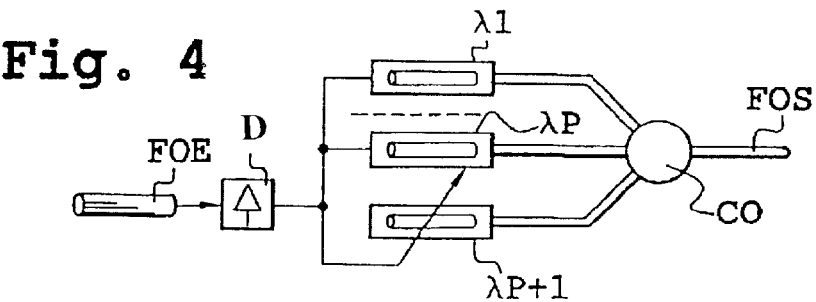
Fig. 4
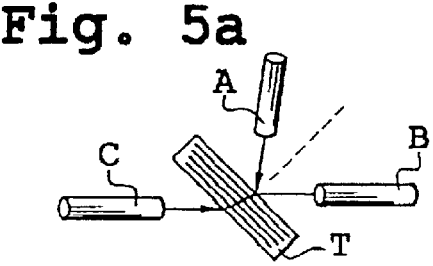
Fig. 5a
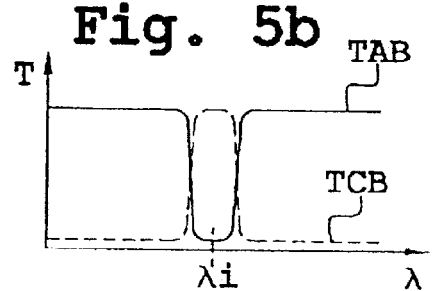
Fig. 5b
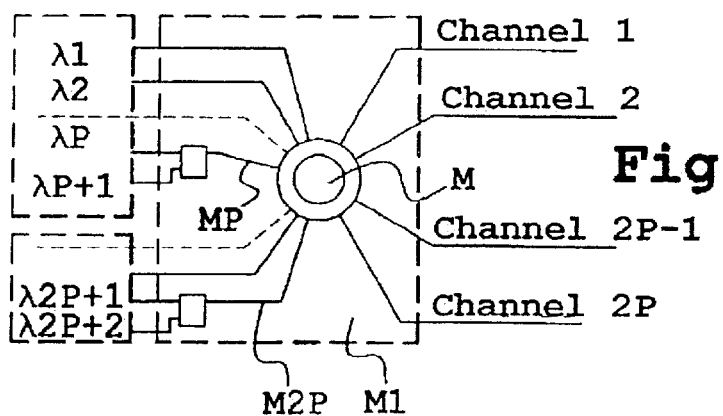
Fig. 6
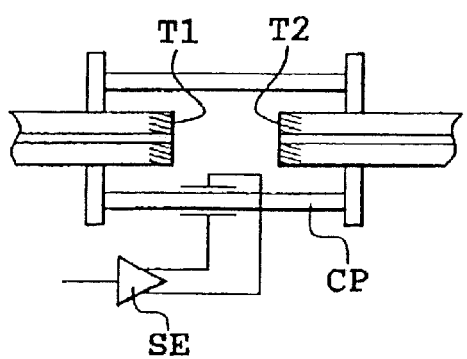
Fig. 7a
Fig. 7b

OPTICAL LINE DISTRIBUTION FRAME

BACKGROUND OF THE INVENTION

1. Field of the Invention

The present invention relates to an optical line distribution frame which can be used in a telecommunication exchange, in particular when information bit rates are very high. The distribution frame of the invention is principally an all-optical distribution frame but some functions can be implemented by conversion to an electronic mode followed by return to an optical mode.

2. Description of the Prior Art

In the field of distribution of lines, also referred to as switching or cross-connection, the function of a distribution frame is to enable a signal conveyed by one of N input lines of the distribution frame to be routed to one of N' output lines of the distribution frame. To simplify the description it is assumed that N'=N, firstly because a call normally requires the same number of calling and called parties and secondly because it can be shown that any other organization can be reduced to an N by N type distribution.

In an all-optical distribution frame the N input lines are optical lines, i.e. individual optical fibers. As an alternative to this, one fiber can convey a plurality of signals simultaneously using wavelength division multiplexing. The signals conveyed by the individual optical fibers can be amplitude-modulated onto carriers with the some wavelength for all of them or with different wavelengths.

A distribution frame core normally includes frequency domain cross-connection modules. To this end, all the separate optical signals terminating at a cross-connection module modulate carriers with different wavelengths. The signals are therefore "colored" by the different wavelengths. The input of a cross-connection module amalgamates or mixes all the signals to be distributed at the same time and distributes the whole of this combination each time between a plurality of output channels. Frequency domain filters in each channel select a single wavelength, i.e. a single optical signal. The combination of the coloring function, the cross-connection function and the filter function achieves the required selective routing.

However, frequency domain cross-connection means that the energy distributed between the channels is shared, and therefore reduced in each channel, simply by virtue of the fact that all the signals are present in all the output channels.

Frequency domain cross-connection is complemented by spatial switching using space switch modules to complement frequency domain cross-connection, in particular to prevent too great a loss of energy if the number of output channels is too high. A space switch can include a mirror which reflects an optical signal emanating from a termination of an optical fiber to one of K terminations of receiving optical fibers. A K by K switch would therefore include K mirrors. It is equally feasible to connect optical fiber ferrules directly to each other. A space switch module is normally opto-mechanical whereas a frequency domain module is all-optical or opto-electronic. All-optical solutions, i.e. solutions with no mechanical moving parts, can be envisaged for spatial cross-connection.

An architecture of the above kind gives rise to two problems. Firstly, frequency domain cross-connection leads to high losses and requires the optical signal to be regenerated before subsequent routing. Secondly, frequency domain cross-connection requires coloring devices whose function is to convert a signal conveyed by a wave at a wavelength $\lambda i$ into a signal conveyed by a wave at a wavelength $\lambda i$. All-optical converters, or more generally opto-electronic converters, of this type are known in the art. These converters are the least reliable components in a distribution frame. They break down. To prevent the harmful consequences of these breakdowns, the circuits of a normal distribution frame include converters which are redundant compared to the number of optical signals to be processed.

For example, FIG. 1 shows a prior art distribution frame in which an input block receiving P optical signals includes P converters $IWT\lambda 1n°1$ to $IWT\lambda 1n°8$ (for simplicity P=8 in this example). To enable the addition of a redundant converter $IWT\lambda 1n°p$ ("p" signifying "protection"), the converters must be preceded by a P to P+1 switch (here an 8 to 9 switch) and followed by a P+1 to P switch. In the solution shown, an input block therefore provides P (8) signals at a wavelength $\lambda 1$. Other input blocks among the M available blocks (M=16 in this example) produce signals with wavelengths from $\lambda 2$ to $\lambda M$. Each of the P outputs of an input block is assigned one of P ranks i. The N=P×M outputs of the M input blocks are connected to the inputs of P star couplers each of which has M inputs of a distribution core C. However, there can be a greater number of star couplers if each of them has fewer inputs. A coupler has the same number of outputs and inputs. The assigned outputs are of rank i.

For example, a first star coupler receives signals from all outputs of rank 1 of the output switches of the input blocks. A final star coupler, coupler number P (number 8), receives signals from the inputs of rank P of the output switches of the input blocks. In other words, each star coupler receives at its inputs signals with different wavelengths. A coupler of this kind therefore mixes all the signals and distributes them to all its outputs. The mixing involves no risk of degrading the quality of the signals since their colors (wavelengths) are different. Nevertheless, and due entirely to the fact that the signals are distributed between a large number of outputs, the energy that can be distributed is inevitably reduced in proportion to the number of outputs.

It follows from what has already been stated that cross-connection can advantageously be complemented by space switching. In this example, all the output channels of rank i of the P star couplers are connected to P inputs of a space switch of rank i. In practice a space switch of this kind therefore receives at its input P mixes of signals colored by wavelengths $\lambda 1$ to $\lambda M$. In an architecture of the above kind a space switch therefore switches groups of signals, i.e. the mixes, rather than individual signals.

The outputs of the space switches are connected to filters for extracting a single wavelength in each mix. The filters and the space switches are controlled in accordance with orientation commands OR processed by a central control unit G.

Output blocks take the signals from the filter outputs and color them with a wavelength suited to their subsequent routing. Like the input blocks, the output blocks include converters. Theses converters suffer from the same lack of reliability as the input converters. They are also complemented by redundant converters.

From the practical point of view, for reasons of reliability, even the distribution core C is duplicated. Thus all the output switches of the input blocks, the star couplers, the space switches, the filters and the input switches of the output blocks are present twice over.

Various technologies are feasible for these various units. If the technology of the output switches of the input blocks and the input switches of the output blocks is a switching technology, energy losses are incurred of the order of 4 dB for each signal. If the technology is a broadcast technology (of the kind used in a star coupler) the losses are higher. The losses depend on the number of outputs and therefore on the number of inputs of the switch. The loss is 6 dB if this number is equal to eight, as shown here.

A star coupler has the same disadvantages and, especially if it is a 16 by 16 coupler, its transmission loss for each signal transmitted on each line is 12 dB. The space switch has a loss of 9 dB. Simplifying, it can therefore be assumed that a distribution core like that shown in FIG. 1 causes a loss of 29 dB on each signal. This loss can be compensated, in particular in the converters of the input blocks and the output blocks, by amplification performed simultaneously with conversion. The amplification can instead be applied elsewhere than in the converters. In the former case, the energy loss can be a problem because it makes the choice of components critical from this point of view.

The architecture shown in FIG. 1 also has a disadvantage if less than the whole of an exchange is to be equipped with the circuit shown. In particular, the above architecture is not suitable if the exchange is under-equipped, for example if it has only eight input channels and eight output channels. This is because, even for a small number of inputs, although only a single input block would be required, all the star couplers would be needed. The star couplers are not very costly in themselves, but organizing the connections leads in practice to providing fifteen to twenty racks to house all of the equipment. All the racks are still needed if the exchange is under-equipped, for reasons of standardization, and even if each of them is three-quarters empty. There is therefore a problem of mechanical arrangement and overall size.

An alternative solution would be to use only one star coupler, which would receive all the signals to be processed. In this case it would nevertheless be necessary to equip all the input blocks, in each case with a smaller number of positions. For example, the first star coupler could be chosen and all the positions of rank 1 of M=16 input blocks equipped accordingly. This would also make it necessary to provide protection in the form of a redundant converter in these M input blocks. This redundancy would be M times greater than that of the first under-equipped version because each input block would have to include a redundant converter. A solution of this kind therefore requires excessive hardware when it is under-equipped, in addition to the losses of 29 dB.

It would still be possible to design specific architectures, but these would have the drawback of requiring complex design calculations for each under-equipped situation and virtually insoluble logistical problems for any after sales service organization confronted with such a disparate installed base.

In one embodiment, shown in FIG. 2, the architecture of the input blocks is modified to provide a systematic solution to the under-equipment problem. In the input blocks, instead of all the converters converting the input signals to a single wavelength $\lambda 1$, they convert them to P different wavelengths. In this case a P by P star coupler, or in one example a 2P by 2P (16 by 16) star coupler, enables a modular structure to be adopted which suits customer needs much better.

The above architecture nevertheless has a major drawback, namely the presence of at least one redundant converter IWTp1. This is because this redundant converter must be able to take over on failure of any of the converters IWT$\lambda$1 to IWT$\lambda$8. Two technologies are feasible. Either the redundant converter is in fact made up of P (8) switchable converters or it is a converter whose frequency can be tuned. On the one hand, the cost of this redundant converter is much greater than the cost of the redundant converters of the FIG. 1 solution. On the other hand, the reliability of the input block would be very much lower precisely because the sources of the tunable converters, which in practice are lasers, are the least reliable components of the converters. In the final analysis, the reliability of the input block would be divided by P, i.e. here divided by eight.

This is because one of the redundant converters could itself break down. If one of the converters should break down, all of the redundancy breaks down. The redundant converter that breaks down might not be the same as a converter of the input block to be replaced by the redundant converter. In practice, the input block would be down P times more frequently. Also, the energy loss is of the same order of magnitude as in FIG. 1: it is still 29 dB.

The object of the invention is to remedy the above disadvantages and to propose an architecture which caters for modular design, and in particular for under-equipment, but makes it less critical by reducing line losses at the time of distribution. The invention also aims to reduce the cost of the input blocks without compromising their reliability.

The idea of the invention is to adopt a solution of the FIG. 2 type except that the redundant converter is not substituted exactly for a converter that is down. To the contrary, in accordance with the invention the redundant converter has to color the optical signal with a redundancy wavelength different from the P wavelengths. The redundancy wavelength is different from all the wavelengths normally distributed by an input block.

Also, the output switch of the input block and the input switch of the output block are eliminated. The star couplers cross connect P+1 input channels to P output channels instead of cross connecting P input channels to P output channels. The star couplers can optionally implement a multiple n of this type of cross-connection. It will be shown that with this approach the additional energy loss in the star coupler is much less than the reduction in losses which results from the elimination of the output switches of the input block and the input switches of the output block.

The hardware saving is therefore doubled, on the one hand because the unnecessary switches are no longer present and on the other hand because the amplification is less critical. It will be shown that the remainder of the switching system remains much the same. The core C must be modified to perform P+1 by P switching instead of P by P switching. This modification is minimal, however. In practice, the switching control unit must allow for information emanating from the input blocks indicating whether a redundant converter is operating or not in those blocks, in addition to the orientation commands OR. This information is already available in the prior art, however, in particular to advise the after sales service department of the need to intervene sooner or later on equipment whose redundant circuits have been switched in because a standard circuit is down. The invention simply uses this facility of the control unit to perform the distribution.

SUMMARY OF THE INVENTION

The invention therefore provides an optical line distribution frame with a redundant optical architecture, said distribution frame including:

N input ports for receiving signals on N optical lines,

M primary wavelength converter blocks each connected on the input side to P=N/M input ports and each producing on the output side optical signals at P different wavelengths, a frequency domain cross-connection and space switching core connected on its input side to the outputs of the primary converter blocks and including modules for switching connections between input channels and output channels of said module, M secondary wavelength converter blocks each connected on its input side to output channels of said core and on its output side to P=N/M output ports, and wherein the primary and/or secondary converters include converter circuits which are redundant compared to the number of signals with different wavelengths to be protected against failure of one of them and:

a primary converter block includes a redundant converter circuit for converting one of the P signals received at the input to a signal at a wavelength $\lambda P+1$ different from the P wavelengths and P+1 outputs, and/or a secondary converter block includes a redundant converter circuit for converting one of the P+1 signals received at the input with any of the wavelengths managed by the primary converter blocks and P outputs.

The invention will be understood better after reading the following description and examining the accompanying diagrammatic drawings. The drawings are provided exclusively by way of non-limiting example of the invention.

BRIEF DESCRIPTION OF THE DRAWINGS

FIGS. 1 and 2 show prior art optical line distribution frame architectures already commented on.

FIG. 4 shows a wavelength converter, a redundant converter and redundant converters according to the invention.

FIGS. 5a and 5b show a coupler or an interference-type multilayer filter and its transmission diagram.

FIG. 6 shows a simple modification to a prior art star coupler to enable its use in accordance with the invention.

FIGS. 7a and 7b show one example of a frequency domain optical filter and its spectrum diagram.

DETAILED DESCRIPTION OF THE PREFERRED EMBODIMENTS

Figure 3:
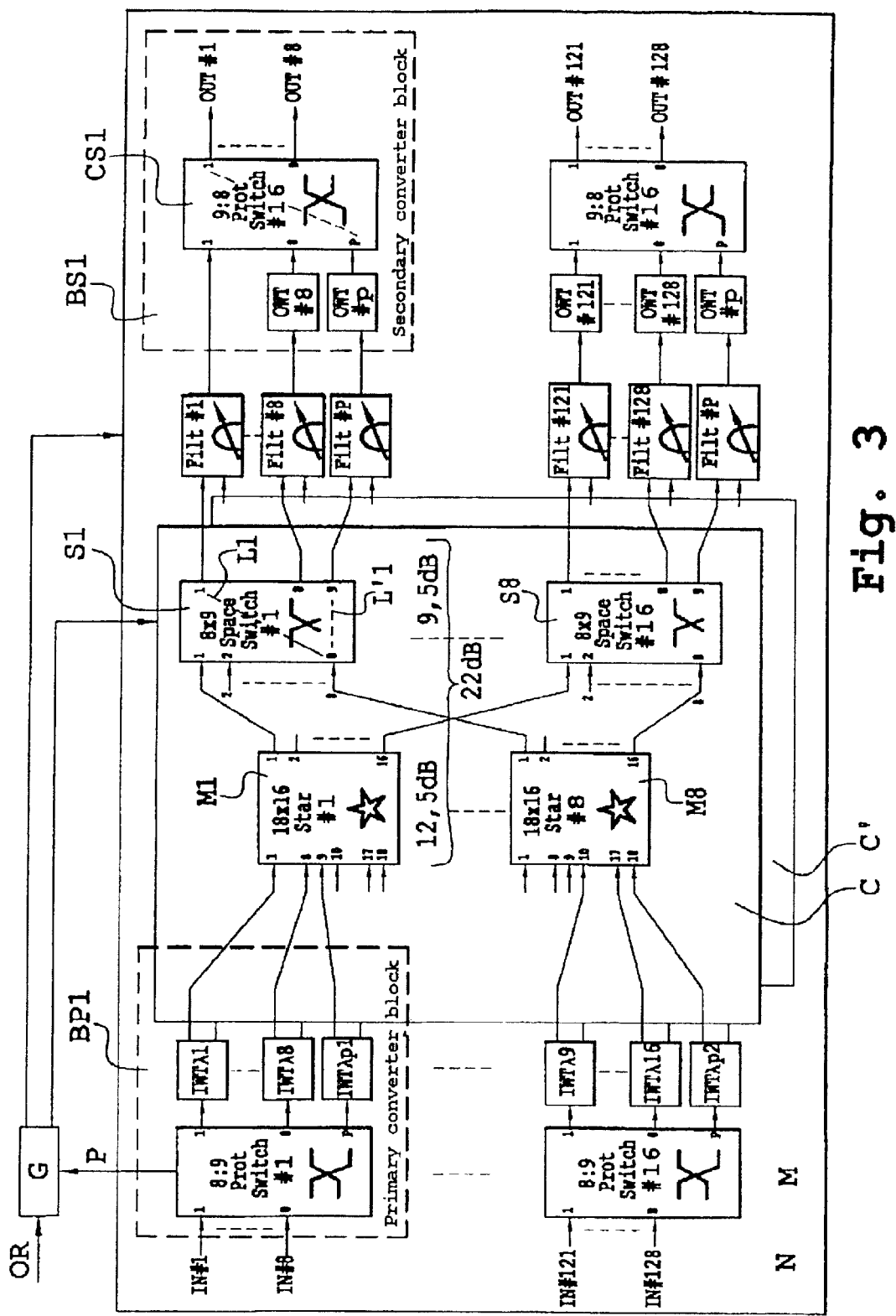
FIG. 3 shows an optical line distribution frame according to the invention.

FIG. 3 shows an optical line distribution frame according to the invention. This all-optical distribution frame has a redundant architecture. The distribution frame has N input ports to receive signals on N optical lines. In one example, in common with the prior art described until now, N=128. The distribution frame also has M primary converter blocks. The primary converter blocks each include P=N/M input ports. In the example where M is equal to 16, P is equal to 8. A frequency domain cross-connection and space switching core C is connected to the outputs of the primary converter blocks. The core C includes cross-connection modules Mi for connecting the input channels and output channels of the module. The distribution frame according to the invention also has M secondary converter blocks connected on the input side to the output channels of the space selector modules S and on the output side to P=N/M output ports of the distribution frame. The converter blocks include converter circuits which are redundant compared to the number of signals with different wavelengths, to protect against failure of one converter of the block. For example, an input converter block comprises converters IWT$\lambda$1 to IWT$\lambda$8 and a redundant converter IWT$\lambda$p1 whose wavelength $\lambda$P+1 is different from all of the wavelengths $\lambda$1 to $\lambda$8 which are themselves different from each other. On their output side, converters with outputs OWTn°1 to OWTn°8 are complemented by a redundant converter OWTn°p. The primary and secondary converter blocks differ from the prior art input and output blocks in that they respectively no longer include any output switches or any input switches.

According to one essential feature of the invention a primary converter block includes a redundant converter circuit IWT$\lambda$p1 for converting one of the signals received at the input into a signal at a wavelength $\lambda$P+1 different from the P wavelength of the other converters IWT$\lambda$1 to IWT$\lambda$8. Also, a primary converter block of this kind naturally has P+1 outputs. According to a second important feature of the invention the core C includes cross-connection modules, and at least one cross-connection module, here the module M1, includes coupling circuits for coupling P+1 input channels of a module and P output channels of that module. In this example P+1 equals 9 and P equals 8.

A first result of this is that the energy loss is no more than 22 dB, 12.5 dB being lost in a converter M1 and a further 9.5 dB being lost in a space switch. All other things being equal, compared to the prior art shown in FIGS. 1 and 2, where there is a loss of 29 dB, an improvement of 7 dB is obtained. Of course the hardware saving results from the absence of the output switches of the input blocks and the input switches of the output blocks. However, the architecture is also totally modular: a module M1 is suitable for a primary converter block BP1 and for a secondary converter block BS1. Under-equipment is therefore very simple to achieve.

From the practical point of view, to be able to use equipment that has already been standardized for prior art applications, the cross-connection module M1 can use 16 by 16 (2P by 2P) star couplers modified to provide 18 by 16 couplers according to the invention. This entails connecting two primary converter blocks to the same star coupler M1. In this case, the eight normal inputs of the first converter BP1 are connected to the eight inputs 1 to 8 of the star coupler M1. The redundant converter, broadcasting an optical signal at a wavelength $\lambda$P+1, is connected to the input 9 of the coupler M1. Eight other normal outputs of another primary converter block are connected to inputs 10 to 17 of the module M1. The first eight normal outputs of the primary converter block BP1 deliver signals with different wavelengths $\lambda$1 to $\lambda$8 and the eight other normal outputs deliver signals with wavelengths $\lambda$9 to $\lambda$16 which are different from each other and from the wavelengths $\lambda$1 to $\lambda$8. According to the invention, the other primary converter block has another converter operating at another wavelength $\lambda$P+2. The signals delivered by the redundant converter of this second converter block are applied to the input 18 of the coupler M1. The two associated primary converter blocks therefore convert 2P optical input signals into 2P optical signals with different wavelengths, whether these wavelengths are the normal wavelengths $\lambda$1 to $\lambda$16 ($\lambda$2P) or include one or both of the two redundant wavelengths $\lambda$P+1 and $\lambda$P+2.

In an architecture of the above kind the core includes M/2 frequency domain cross-connection modules. Each module is adopted to couple 2P+2 input channels and 2P output channels of the module. This is the case of the module M1 shown here.

Rather than adopting an architecture with only two primary converter blocks for each frequency domain cross-connection module, larger cross-connection modules can be chosen, for example ones accepting three or four, or even more, primary converter blocks. Also, rather than choosing only one redundant primary converter for each primary converter block, the primary converter blocks can be provided with two or even more than two redundant primary converters whose frequencies are different from each other and also different from the frequencies of the other primary converters connected with them to the same frequency domain cross-connection module.

As the frequency domain distribution may not be sufficient, a distribution core according to the invention is made up of first stages for wavelength division multiplexing and broadcasting multiplexed signals and a space switching second stage. The input side of the core is connected to the outputs of the primary converter blocks. Accordingly, as in the prior art, the modules like the module M1 are assisted by space switching modules S1 to S8. The space switching modules are connected to the secondary converter blocks via a battery of filters FILTn°i effecting the required frequency selection.

In the some way as the existence of a redundant converter circuit in a primary converter block leads to a redundant input of a frequency domain cross-connection module, the presence of a redundant converter circuit in a secondary converter block leads to the existence of a redundant output of a space switching module Si. The failure of a converter circuit OWTn°1 in the secondary converter block BS1 is therefore shown. The link L1 which, for switching reasons connected with the commands OR should terminate at the converter circuit OWTn°1, is rerouted as a repair link L'1. The link L'1 uses the redundant converter circuit OWTn°p. The existence of an output switch CS1 of the secondary converter block BS1 is then-exploited to route the signals available on the redundant link L'1 to the required output.

In the same way as previously, more than two primary converters could be connected to the same cross-connection module. It is possible to adopt an architecture at the output different from that shown. For example, the secondary converter blocks can include n P outputs where n has a value other than 1.

As a general rule, adopting the following terminology, the following result for one example can be achieved with the following parameters:

| Cross-connection system: | |
|---|---|
| N1: number of inputs | N1 = 128 |
| N2: number of outputs | N2 = 128 |
| Primary converter block: | |
| P1: number of active wavelength converters | P1 = 8 |
| R1: number of redundant wavelength converters | R1 = 1 |
| P1 inputs and P1 + R1 outputs | P1 + R1 = 9 |
| n1: number of primary converter blocks connected to a star coupler | n1 = 2 |
| number of different wavelengths to generate: | n1 × (P1 + R1) + 18 |
| M1 primary converter blocks in total such that M1 × P1 = N1: | M1 = 16 |
| Secondary converter block: | |
| P2: number of active wavelength converters | P2 = 8 |
| R2: number of redundant wavelength converters | R2 = 1 |
| P2 + R2 inputs | P2 + R2 = 9 |
| n2: number of secondary converter blocks connected to a space selector P2 outputs | n2 = 1 |
| M2 secondary converter blocks in total such that M2 × P2 = N2: | M2 = 16 |
| Frequency division multiplexing and spatial selection block: | |
| M1 × (P1 + R1) inputs | 144 |
| M2 × (P2 + R2) outputs | 144 |

| -continued | |
|---|---|
| Star coupler: | |
| n1 × (P1 + R1) inputs | 18 |
| M2/n2 outputs | 16 |
| M1/n1 star couplers in total | 8 |
| Space selector: | |
| M1/n1 inputs | 8 |
| n2 × (P2 + R2) outputs | 9 |
| M2/n2 selectors in total | 16 |

Figure 2:
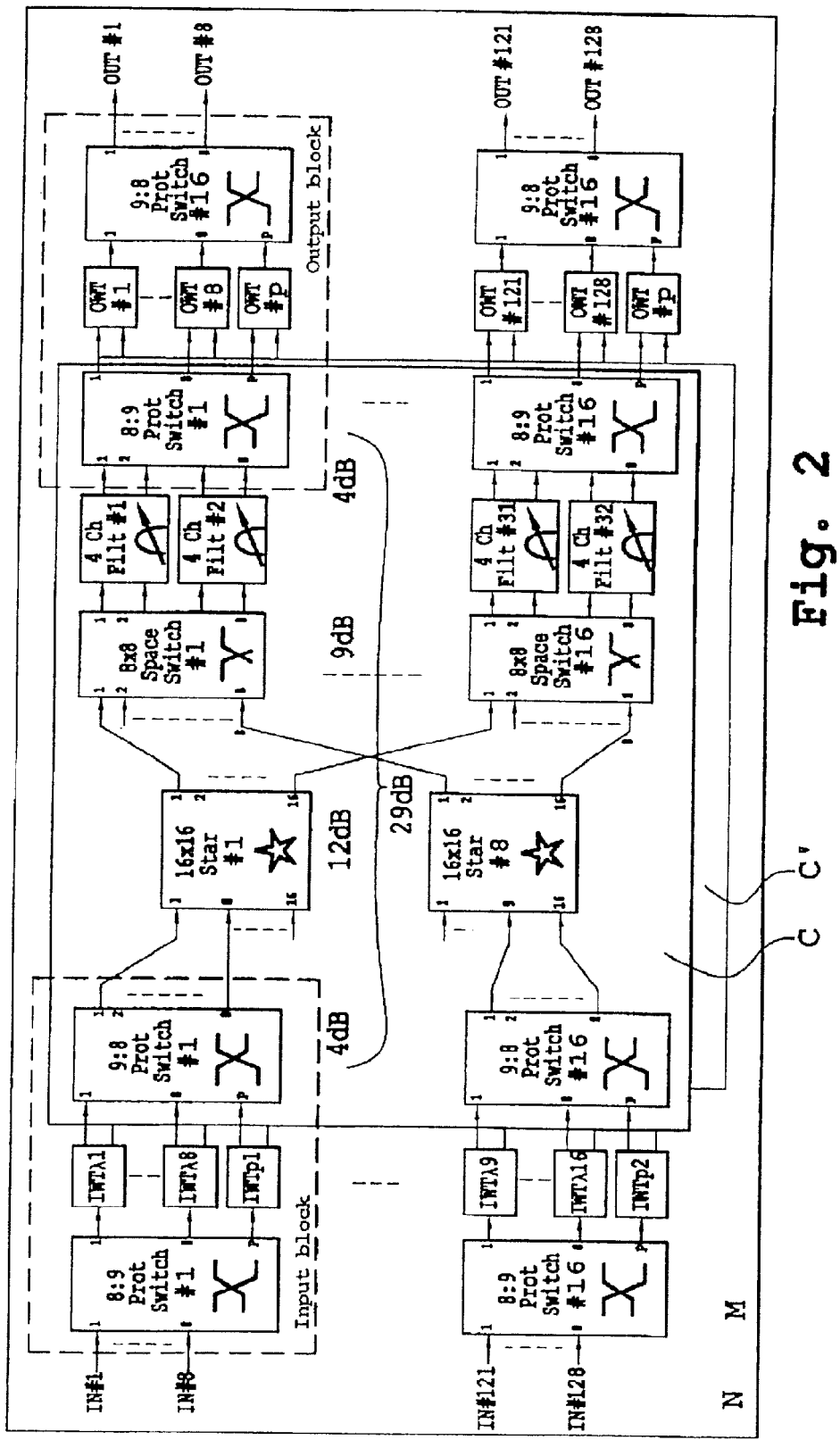

It is additionally possible to adopt a hybrid structure, with a primary converter block like that of the invention involving a module M1, but with the output of the latter connected to an output block like that shown in FIG. 2. Instead, and to the contrary, a structure can be chosen with a space switch S1 and a secondary converter block BS1, as in the invention, but using an input block like that shown in FIG. 2 and a corresponding cross-connection module at the input. In these latter two cases the only benefit is the elimination of a single input or output switch. The result from the energy point of view would be less good, but still an improvement over the prior art. These degraded solutions may be suitable for modifying plant already partly installed.

FIG. 4 shows the general structure of a wavelength converter circuit. An input optical fiber FOE is connected to a detector D which produces an electronic signal. The electronic signal is used to drive (control modulation of) a laser source emitting at a wavelength $\lambda 1$ or a laser source emitting at another wavelength $\lambda i$ where i is less than or equal to P. According to the invention, the redundant converter produces a signal at a wavelength $\lambda P+1$ which is different from any of the wavelengths $\lambda 1$ to $\lambda P$. FIG. 4 shows both variants of a redundant converter circuit of an input block in the embodiment shown in FIG. 2. The redundant converter includes P sources $\lambda 1$ to $\lambda P$. The P sources all receive the signal from the detector and all deliver their optical signal into a coupler CO connected on the output side to an output optical fiber FOS. Alternatively the additional source is a tunable source, in which case the coupler is of no utility. Nevertheless, in both cases implementation is costly. The converter circuit according to the invention is a simple circuit. Only its wavelength $\lambda P+1$ is different from the prior art wavelengths, and does not need to be adjusted.

FIGS. 5a and 5b show one example of an interference-type multilayer coupling circuit. In this case a substrate T made up of layers of materials of different kinds is placed as a reflector on the propagation path of a wave emanating from an origin A or as a transmitter on the path of a wave emanating from an origin C. After multiple reflections, the reflected wave has a reflection deficit for a wavelength $\lambda i$ which is precisely the wavelength for which a signal is transmitted correctly. A coupler of this kind couples two waves A and C with different wavelengths. FIG. 6 shows an adaptation of the prior art star coupler M to produce a coupler M1 according to the invention. With a coupler M of this kind one of the inputs, for example the input MP or the input M2P, is connected to an output of a coupler like shown in FIG. 5a, which receives on its two inputs signals A and C at frequencies $\lambda P$ and $\lambda P+1$, on the one hand, or $\lambda 2P+1$ and $\lambda 2P+2$, on the other hand. A coupler of this kind has very low insertion losses.

FIGS. 7a and 7b show one embodiment of wavelength selection filters. Two terminations T1 and T2 of two optical fibers are placed face-to-face and are treated so that each is highly reflective. The distance between the terminations encourages the transmission of a wave whose wavelength is a sub-multiple of that distance, which is varied by a piezo-electric crystal CP excited by an electrical supply SE, for example. FIG. 7b shows the modification of the wavelength transmitted and the passband of a filter of this kind as a function of the excitation signal.

Figure 1:
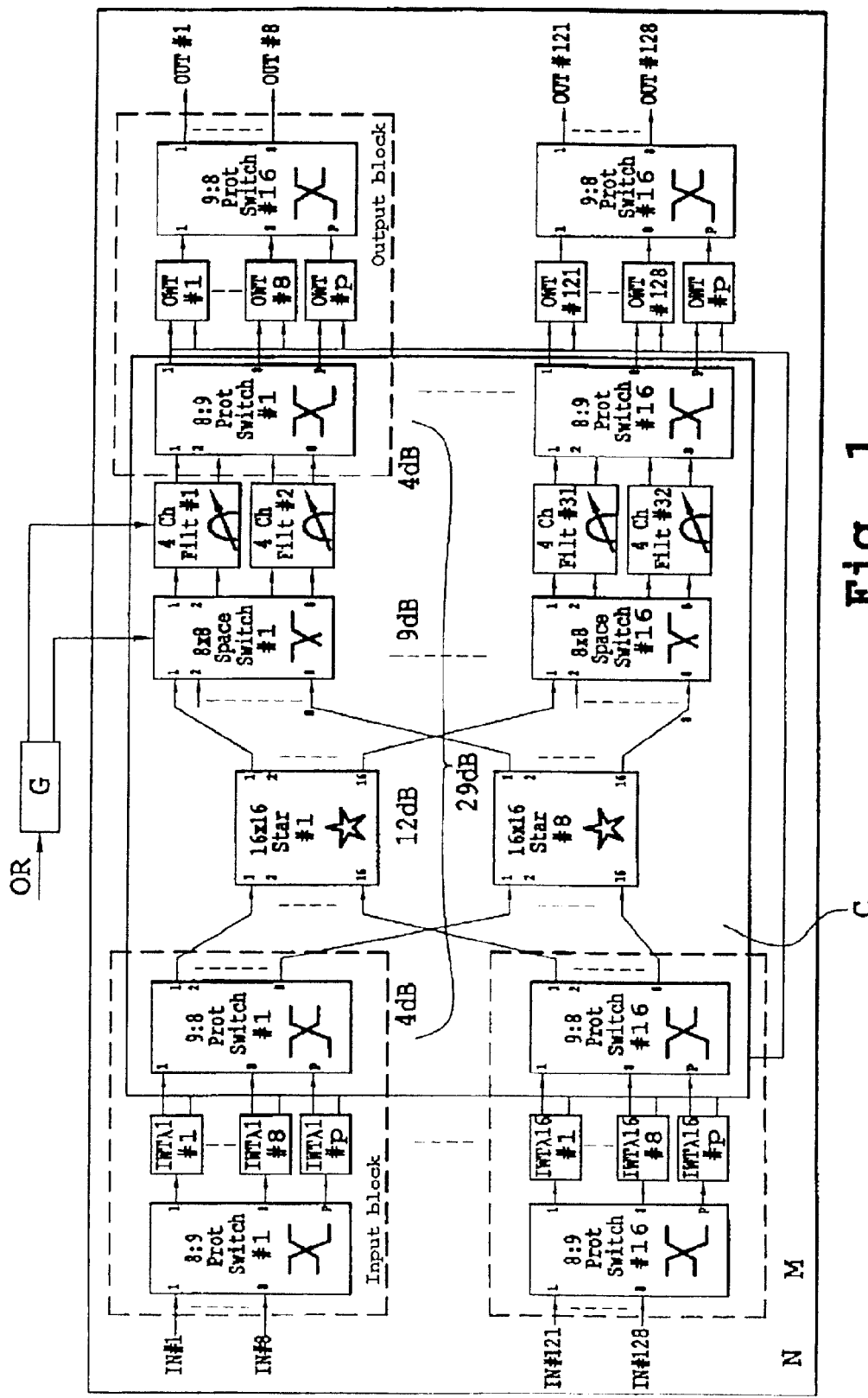

Although in the architecture shown in FIGS. 1 and 2 the filters are part of the distribution cores C, in the invention the filters can be associated with the secondary converter blocks. This architecture has the advantage that if the cores are duplicated as cores C and C' (for reasons of reliability and as known in the art), it is not necessary to duplicate the filters. Consequently, although the invention provides P+1 filters to process P signals, i.e. an apparently greater number, in fact there is a saving in terms of the number of filters as they are not present twice over in the duplicated cores C and C'. The saving is equal to M×P+1.

The solution according to the invention nevertheless requires these filters to be controlled in accordance with the repair status of one or more of the primary converter blocks. In the prior art (FIG. 1) the commands for calibrating the filters depend entirely on the cross-connection effected in the star couplers and in the space switches. This is justified because the wavelengths $\lambda 1$ to $\lambda P$ are reproduced by the redundant circuits. In the invention, given that a signal can be conveyed at a wavelength $\lambda P+1$, the filters which select the signals must be able to extract them as and when required. This being the case, the general control unit G must receive signaling relating to the implementation of the redundancy protection in the primary converter blocks in addition to the distribution commands OR. In this case, the wavelengths $\lambda P+1$ and $\lambda 2P+2$ are preferably within the FIG. 7b range of wavelengths from $\lambda mini1$ to $\lambda maxiP$, which can be obtained by adjusting the excitation.

What is claimed is:

1. An optical line distribution frame with a redundant optical architecture, said distribution frame including:

N input ports for receiving signals on N optical lines,

M primary wavelength converter blocks each connected on the input side to P=N/M input ports and each producing on the output side optical signals at P different wavelengths, a frequency domain cross-connection and space switching core connected on its input side to outputs of the primary converter blocks and including modules for switching connections between input channels and output channels of said modules and M secondary wavelength converter blocks each connected on its input side to output channels of said core and on its output side to P=N/M output ports, wherein at least one of the primary wavelength converter blocks and the secondary wavelength converter blocks include converter circuits which are redundant compared to the number of signals with different wavelengths to be protected against failure, and wherein said distribution frame further includes at least one of:

one or more primary converter blocks having a redundant converter circuit for converting one of the P signals received at the input to a signal at a fixed wavelength $\lambda P+1$ different from the P wavelengths and P+1 outputs, and one or more secondary converter blocks having a redundant converter circuit for converting one of the P+1 signals received at the input with any of the wavelengths managed by the primary converter blocks and P outputs.

2. The distribution frame claimed in claim 1 wherein said frequency domain cross-connection and space switching core includes a wavelength division multiplexing and multiplexed signal broadcasting first stage and a space switching second stage.

3. The distribution frame claimed in claim 1 wherein:

a primary converter block includes a redundant converter circuit for converting one of the P signals received at the input into a signal at a wavelength $\lambda P+1$ different from the P wavelengths and P+1 outputs, and the core includes a frequency domain cross-connection module including circuits for broadcast coupling P+1 input channels of the frequency domain module into P output channels of the frequency domain module.

4. The distribution frame claimed in claim 1 wherein:

a secondary converter block includes a redundant converter circuit for converting one of the P signals received at the input with one of 2P+2 different wavelengths into a signal at a given wavelength, and the core includes a broadcast space cross-connection module including switching circuits for switching connections between P input channels of the space module and P+1 output channels of the space module.

5. The distribution frame claimed in claim 1 including two primary converter blocks which convert 2P optical input signals into 2P optical signals with different wavelengths.

6. The distribution frame claimed in claim 1 wherein said core includes M/2 frequency domain cross-connection modules for broadcast coupling 2P+2 input channels to 2P output channels of the module.

7. The distribution frame claimed in claim 1 wherein said core includes space switching modules connected to the frequency domain cross-connection modules and to the secondary converter blocks.

8. The distribution frame claimed in claim 1 wherein said core includes duplicated sets of modules.

9. The distribution frame claimed in claim 1 wherein said secondary converter blocks are connected to filters having frequencies that are tuned according to an operating state of the primary converter blocks, and wherein said filters are located outside of said frequency domain cross-connection and space switching core.

10. The distribution frame claimed in claim 1 wherein said wavelength $\lambda P+1$ is close to the P wavelengths.

11. The distribution frame claimed in claim 1 wherein the input converter blocks include an input switch with P inputs and P+1 outputs and P+1 converter circuits connected by their P+1 outputs directly to the input channels of the core.

12. The distribution frame claimed in claim 1 wherein said output converter blocks include P+1 converter circuits connected by their P+1 inputs directly to the output channels of the core and an output switch with P+1 inputs and P outputs.

* * * * *